United States Patent
Tainaka

(10) Patent No.: US 8,412,874 B2
(45) Date of Patent: Apr. 2, 2013

(54) DATA TRANSFER CIRCUIT

(75) Inventor: Koji Tainaka, Osaka (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 407 days.

(21) Appl. No.: 12/793,830

(22) Filed: Jun. 4, 2010

(65) Prior Publication Data

US 2010/0318705 A1    Dec. 16, 2010

(30) Foreign Application Priority Data

Jun. 15, 2009    (JP) ................................ 2009-142056

(51) Int. Cl.
    *G06F 13/38* (2006.01)
(52) U.S. Cl. ...................................................... 710/307
(58) Field of Classification Search .................. 710/66, 710/307; 713/400–401
    See application file for complete search history.

(56) References Cited

U.S. PATENT DOCUMENTS

| | | | | |
|---|---|---|---|---|
| 3,781,819 A | * | 12/1973 | Geng et al. ..................... | 710/307 |
| 4,593,373 A | * | 6/1986 | Kiuchi et al. .................. | 708/518 |
| 4,878,166 A | * | 10/1989 | Johnson et al. ................ | 710/307 |
| 5,256,912 A | * | 10/1993 | Rios ............................... | 327/144 |
| 5,274,763 A | * | 12/1993 | Banks ............................ | 710/316 |
| 5,313,594 A | * | 5/1994 | Wakerly ......................... | 710/105 |
| 5,428,763 A | * | 6/1995 | Lawler ........................... | 710/307 |
| 5,446,845 A | * | 8/1995 | Arroyo et al. ................. | 710/307 |
| 5,471,632 A | * | 11/1995 | Gavin et al. ................... | 710/104 |
| 5,487,019 A | * | 1/1996 | Ueta et al. ....................... | 710/66 |
| 5,524,112 A | * | 6/1996 | Azuma et al. ................. | 370/402 |
| 5,611,071 A | * | 3/1997 | Martinez, Jr. ................. | 711/133 |
| 5,613,078 A | * | 3/1997 | Kishigami .................... | 710/307 |
| 5,687,328 A | * | 11/1997 | Lee ................................ | 710/307 |
| 5,768,546 A | * | 6/1998 | Kwon ........................... | 710/307 |
| 5,802,132 A | * | 9/1998 | Pathikonda et al. ............ | 377/48 |
| 5,812,798 A | * | 9/1998 | Moyer et al. .................. | 710/307 |
| 6,732,203 B2 | * | 5/2004 | Kanapathippillai et al. ..... | 710/66 |
| 7,006,527 B1 | * | 2/2006 | O'Connor ...................... | 370/466 |
| 7,447,932 B2 | * | 11/2008 | Ichien et al. ................... | 713/400 |
| 2004/0122994 A1 | * | 6/2004 | Hammitt et al. ................ | 710/36 |

FOREIGN PATENT DOCUMENTS

| | | |
|---|---|---|
| JP | 8-129506 A | 5/1996 |
| JP | 2003-058416 A | 2/2003 |
| JP | 2004-227565 A | 8/2004 |
| JP | 2007-164415 A | 6/2007 |
| JP | 2007-334943 A | 12/2007 |

* cited by examiner

*Primary Examiner* — Paul R Myers
(74) *Attorney, Agent, or Firm* — Westerman, Hattori, Daniels & Adrian, LLP

(57) ABSTRACT

A data transfer circuit includes a fetcher which fetches data having L words (L: integer of 2 or more), each word of which has a first bit width. A first divider divides each data of preceding M words (M: integer of less than L), out of the data fetched by the fetcher, into partial data having a second bit width smaller than the first bit width. A holder temporarily holds data having N words (N: integer equivalent to L-M) succeeding to the M words, out of the data fetched by the fetcher. A second divider divides each data of the N words held by the holder, into partial data having the second bit width. An outputter outputs the partial data divided by the first divider and the partial data divided by the second divider in a time-division manner.

7 Claims, 9 Drawing Sheets

(A) CLK1

(B) INPUT DATA (FROM BUS)

(C) OUTPUT OF F/F 22 (WRITING TO SRAM54)

(D) OUTPUT OF SEL 78 (PRECEDING 8 WORDS)

(E) CLK2

(F) READING-OUT FROM SRAM54

(G) OUTPUT OF F/F 56

(H) OUTPUT OF SEL 78 (SUCCEEDING 8 WORDS)

(I) OUTPUT DATA (TO SDRAM)

(A) CLK1

(B) INPUT DATA (FROM BUS)

(C) OUTPUT OF F/F22

(D) OUTPUT DATA (TO SDRAM)

FIG.8

(A) CLK1

(B) INPUT DATA (FROM SDRAM)

| A | A | B | B | C | C | D | D | E | E | F | F | G | G | H | H | I | I | J | J | K | K | L | L | M | M | N | N | O | O | P | P |
|---|---|---|---|---|---|---|---|---|---|---|---|---|---|---|---|---|---|---|---|---|---|---|---|---|---|---|---|---|---|---|---|
| 1 | 2 | 1 | 2 | 1 | 2 | 1 | 2 | 1 | 2 | 1 | 2 | 1 | 2 | 1 | 2 | 1 | 2 | 1 | 2 | 1 | 2 | 1 | 2 | 1 | 2 | 1 | 2 | 1 | 2 | 1 | 2 |

(C) OUTPUT OF COMBINATOR 96

| A | B | C | D | E | F | G | H | I | J | K | L | M | N | O | P |

(D) READING-OUT FROM SRAM 98

| A | B | C | D | E | F |

(E) OUTPUT OF SEL 162 (PRECEDING 6 WORDS)

| A | B | C | D | E | F |

(F) OUTPUT OF SEL 162 (SUCCEEDING 10 WORDS)

| G | H | I | J | K | L | M | N | O | P |

(G) OUTPUT DATA (TO BUS)

| A | B | C | D | E | F | G | H | I | J | K | L | M | N | O | P |

(A) CLK1

(B) INPUT DATA (FROM SDRAM)

(C) OUTPUT DATA (TO BUS)

DATA TRANSFER CIRCUIT

CROSS REFERENCE OF RELATED APPLICATION

The disclosure of Japanese Patent Application No. 2009-142056, which was filed on Jun. 15, 2009, is incorporated herein by reference.

BACKGROUND OF THE INVENTION

1. Field of the Invention

The present invention relates to a data transfer circuit. More particularly, the present invention relates to a data transfer circuit which transfers input data toward a target object having a bit width different from a bit width of the input data.

2. Description of the Related Art

According to one example of this type of circuit, a buffer group contains a plurality of. FIFO-type buffers, each of which has a bit width larger than a client data width. In order to read out and write data from and into such a buffer group, a command decode circuit issues a command and an address that are based on an address and a command received from a master device, toward a memory device. Access to the memory device is executed by using a burst length previously set according to a bus width of the memory device. Thereby, the bus width of the memory device can be easily changed, and a band width can be effectively used in an architecture in which the burst access is taken into consideration.

However, in the above-described circuit, in order to read out and write the data, the plurality of FIFO-type buffers, each of which has the bit width larger than the client data width are utilized. Thus, in the above-described circuit, there is a potential risk that a circuit scale is increased.

SUMMARY OF THE INVENTION

A data transfer circuit according to the present invention comprises: a fetcher which fetches data having L words (L: integer of 2 or more), each word of which has a first bit width; a first divider which divides each data of preceding M words (M: integer of less than L), out of the data fetched by the fetcher, into partial data having a second bit width smaller than the first bit width; a holder which temporarily holds data having N words (N: integer equivalent to L-M) succeeding to the M words, out of the data fetched by the fetcher, a second divider which divides each data of the N words held by the holder, into partial data having the second bit width; and an outputter which outputs the partial data divided by the first divider and the partial data divided by the second divider in a time-division manner.

A data transfer circuit according to the present invention comprises: a fetcher which fetches data having L words (L: integer of 2 or more), each word of which has a first bit width; a first combiner which combines data of at least preceding M words (M: integer of less than L), out of the data fetched by the fetcher so as to create combined data, each word of which has a second bit width larger than the first bit width; a holder which temporarily holds the combined data created by the first combiner, a second combiner which combines data of succeeding N words (N: integer equivalent to L-M), out of the data fetched by the fetcher, so as to create combined data, each word of which has the second bit width; and an outputter which outputs the combined data held by the holder and the combined data created by the second combiner in a time-division manner.

The above described features and advantages of the present invention will become more apparent from the following detailed description of the embodiment when taken in conjunction with the accompanying drawings.

BRIEF DESCRIPTION OF THE DRAWINGS

FIG. 8(A) is a waveform chart showing one example of the clock CLK1;

FIG. 8(B) is an illustrative view showing one example of the input data;

FIG. 8(C) is an illustrative view showing one example of data written into an SRAM 98;

FIG. 8(D) is an illustrative view showing one example of data read out from the SRAM 98;

FIG. 8(E) is an illustrative view showing one portion of data outputted from a selector 162;

FIG. 8(F) is an illustrative view showing another portion of the data outputted from the selector 162;

FIG. 8(G) is an illustrative view showing one example of the output data;

DETAILED DESCRIPTION OF THE PREFERRED EMBODIMENTS

Figure 1:
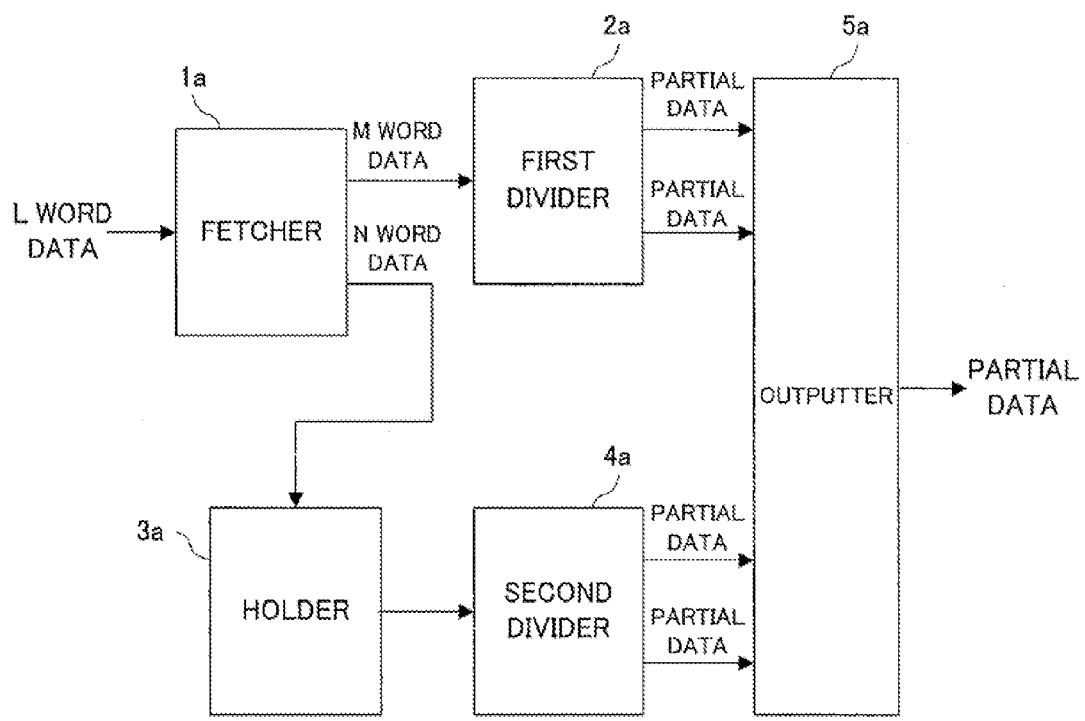
FIG. 1 is a block diagram showing a basic configuration of the present invention.

With reference to FIG. 1, a data transfer circuit of the present invention is basically configured as follows: A fetcher 1a fetches data having L words (L: integer of 2 or more), each word of which has a first bit width. A first divider 2a divides each data of preceding M words (M: integer of less than L), out of the data fetched by the fetcher 1a, into partial data having a second bit width smaller than the first bit width. A holder 3a temporarily holds data having N words (N: integer equivalent to L-M) succeeding to the M words, out of the data fetched by the fetcher 1a. A second divider 4a divides each data of the N words held by the holder 3a, into partial data having the second bit width. An outputter 5a outputs the partial data divided by the first divider 2a and the partial data divided by the second divider 4a in a time-division manner.

Thus, the dividing process performed on the preceding M words is executed by the first divider 2a. Moreover, the dividing process performed on the succeeding N words is executed by the second divider 4a after the temporal holding process by the holder 3a Furthermore, the partial data obtained by these dividing processes are outputted in a time-division manner. Thereby, it becomes possible to transfer the input data toward the target object having a bit width smaller than the bit width of the input data while inhibiting a circuit scale.

Figure 2:
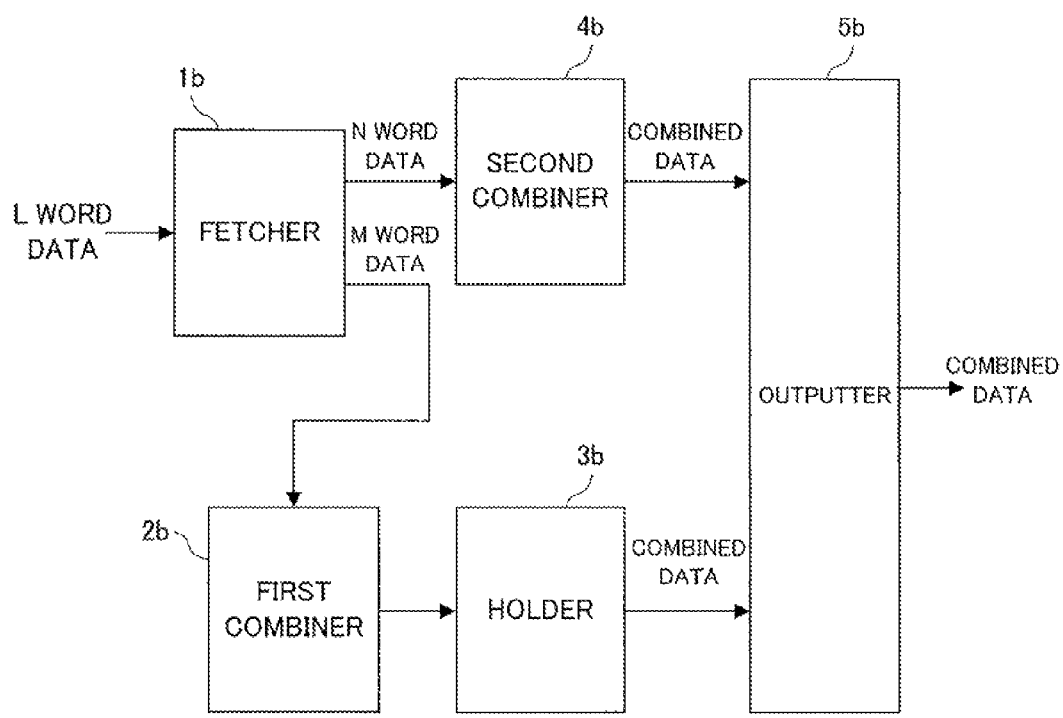
FIG. 2 is a block diagram showing a basic configuration of the present invention.

With reference to FIG. 2, the data transfer circuit of the present invention is basically configured as follows: A fetcher 1b fetches data having L words (L: integer of 2 or more), each word of which has a first bit width. A first combiner 2b combines data having at least preceding M words (M: integer of less than L), out of the data fetched by the fetcher 1b, so as to create combined data, each word of which has a second bit width larger than the first bit width. A holder 3b temporarily holds the combined data created by the first combiner 2b. A second combiner 4b combines data having succeeding N words (N: integer equivalent to L-M), out of the data fetched by the fetcher 1b, so as to create combined data, each word of which has the second bit width. An outputter 5b outputs the combined data held by the holder 3b and the combined data created by the second combiner 4b in a time-division manner.

Thus, the combined data corresponding to the preceding M words is created by the first combiner 2b and temporarily held by the holder 3b. Also, the combined data corresponding to the succeeding N words is created by the second combiner 4b. Furthermore, such combined data are outputted in a time-division manner. Thereby, it becomes possible to transfer the input data toward the target object having the bit width larger than a bit width of the input data while inhibiting a circuit scale.

Figure 3:
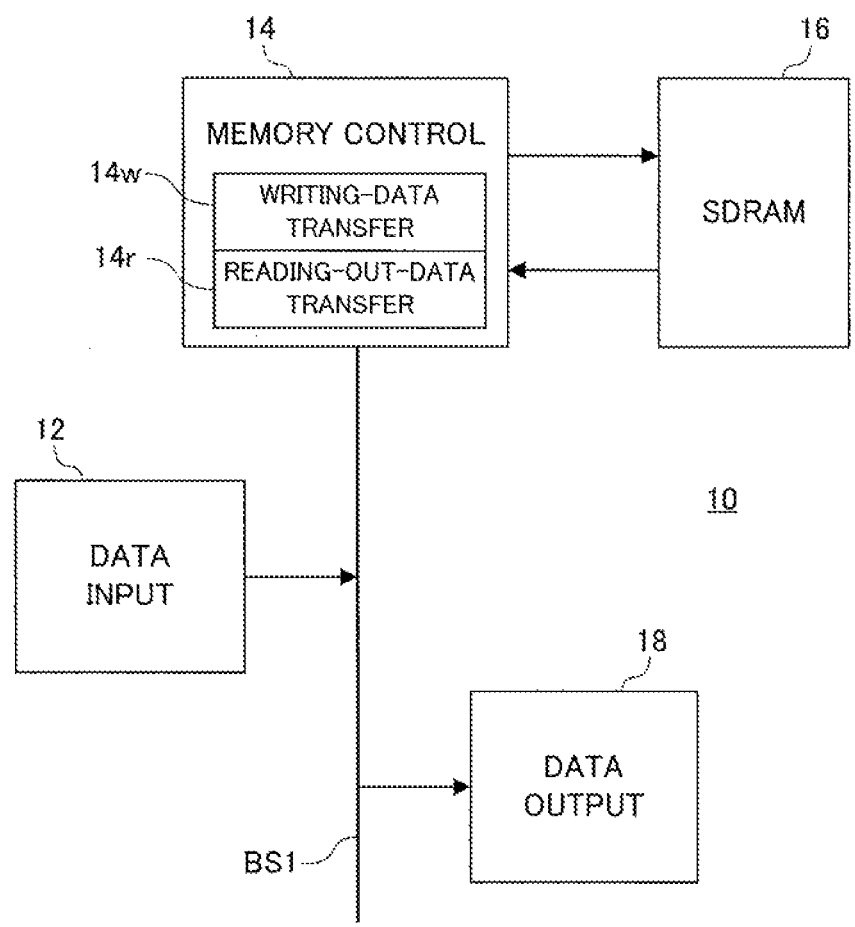
FIG. 3 is a block diagram showing a configuration of one embodiment of the present invention.

With reference to FIG. 3, a data processing apparatus 10 of this embodiment includes a data input circuit 12 which inputs data, each word of which has a 32-bit width. In this case, the data is repeatedly inputted by each 16 words. The inputted data undergoes a data bus BS1, and then is applied to a writing-data transfer circuit 14w of a memory control circuit 14.

If an SDRAM 16 is a memory in which a 16-bit width is adopted, then the writing-data transfer circuit 14w converts the data (16-word data, each word of which has a 32-bit width) applied from the data bus BS1, into 32-word data, each word of which has a 16-bit width, and outputs the converted data toward the SDRAM 16. On the other hand, if the SDRAM 16 is a memory in which a 32-bit width is adopted, then the writing-data transfer circuit 14w directly outputs the data applied from the data bus BS1 toward the SDRAM 16.

The data accommodated in the SDRAM 16 is read out by the memory control circuit 14. If the SDRAM 16 is an SDRAM in which a 16-bit width is adopted, then the data, each word of which has a 16-bit width, is read out by each 32 words. On the other hand, if the SDRAM 16 is an SDRAM in which a 32-bit width is adopted, then the data each word of which has a 32-bit width is read out by each 16 words.

If the SDRAM 16 is a memory in which a 16-bit width is adopted, then a reading-out-data transfer circuit 14r converts the read-out data (32-word data, each word of which has a 16-bit width), into 16-word data, each word of which has a 32-bit width, and outputs the converted data toward the data bus BS1. On the other hand, if the SDRAM 16 is a memory in which a 32-bit width is adopted, then the reading-out-data transfer circuit 14r directly outputs the read-out data toward the data bus BS1. The data that has undergone the data bus BS1 is then outputted by a data output circuit 18.

Figure 4:
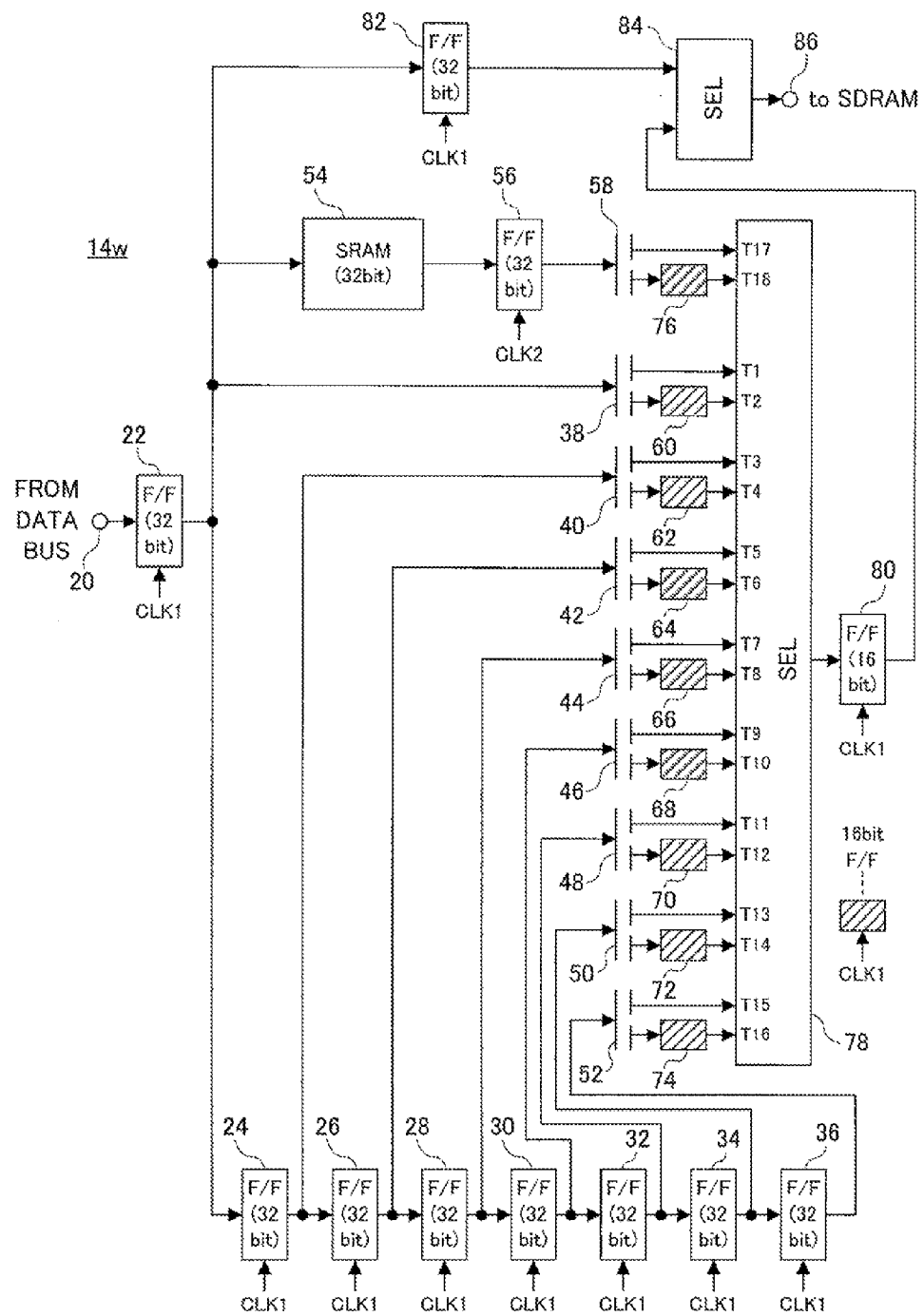
FIG. 4 is a block diagram showing one example of a configuration of a writing-data transfer circuit applied to the embodiment in FIG. 3.
Figure 5:
FIG. 5(A) is a waveform chart showing one example of a clock CLK1.
FIG. 5(B) is an illustrative view showing one example of input data.
FIG. 5(C) is an illustrative view showing one example of data outputted from an F/F circuit 22.
FIG. 5(D) is an illustrative view showing one portion of data outputted from a selector 78.
FIG. 5(E) is a waveform chart showing one example of a clock CLK2.
FIG. 5(F) is an illustrative view showing one example of data read out from an SRAM 54.
FIG. 5(G) is an illustrative view showing one example of data outputted from an F/F circuit 56.
FIG. 5(H) is an illustrative view showing another portion of the data outputted from the selector 78.
FIG. 5(I) is an illustrative view showing one example of output data.
Figure 5:
Figure 5:
Figure 5:
Figure 5:
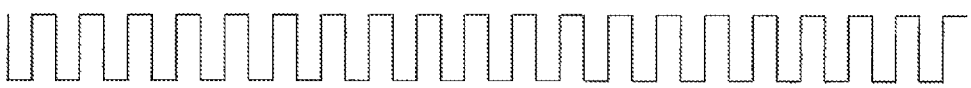
Figure 5:
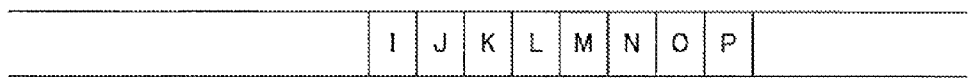
Figure 5:
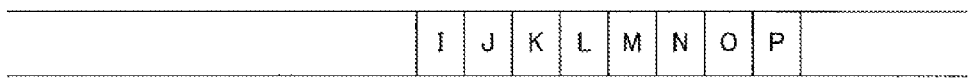
Figure 5:
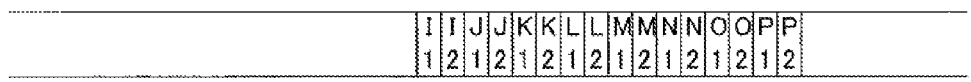
Figure 5:
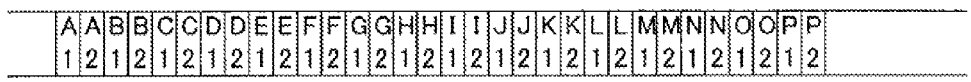
Figure 6:
FIG. 6(A) is a waveform chart showing one example of the clock CLK1.
FIG. 6(B) is an illustrative view showing one example of the input data.
FIG. 6(C) is an illustrative view showing one example of the data outputted from the F/F circuit 22.
FIG. 6(D) is an illustrative view showing one example of the output data.
Figure 6:
Figure 6:
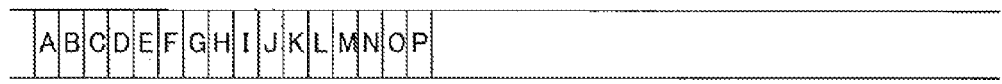
Figure 6:
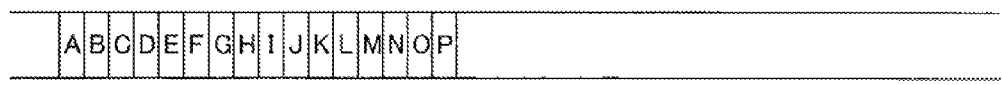

The writing-data transfer circuit 14w is configured as shown in FIG. 4. The data that has been transferred through the data bus BS1 is fetched by an input terminal 20. The data to be inputted is the 16-word data, each word of which has a 32-bit width, and in synchronization with a clock CLK1 shown in FIG. 5(A) or FIG. 6(A), is applied to an F/F circuit 22 as shown in FIG. 5(B) or FIG. 6(B). The F/F circuit 22 has a 32-bit width, and latches the input data in response to the clock CLK1. The latched data is outputted from the F/F circuit 22 at a timing shown in FIG. 5(C) or FIG. 6(C).

It is noted that to each of the 16 words, for the sake of convenience, any one of reference symbols "A" to "P" is assigned.

Data A, which is a first word, outputted from the F/F circuit 22 is divided by a distributor 38 into partial data A1 and A2. The partial data A1 is equivalent to upper 16-bit data, and the partial data A2 is equivalent to lower 16-bit data. The partial data A1 is directly inputted to a terminal T1 of a selector 78 while the partial data A2 undergoes an F/F circuit 60 and then is inputted to a terminal T2 of the selector 78. The F/F circuit 60 has a 16-bit width, and in response to the clock CLK1, executes a latch operation. Therefore, the partial data A2 is inputted to the selector 78 with a delay of one cycle of the clock CLK1.

Data B to H, which are second to eighth words, outputted from the F/F circuit 22 are applied to seven F/F circuits 24 to 36 connected in series. Each of the F/F circuits 24 to 36 has a 32-bit width, and latches the data B to H, which are the second to eighth words, in response to the clock CLK1.

A distributor 40 divides the data B, which is the second word, outputted from the F/F circuit 24 into partial data B1 equivalent to upper 16-bit data and partial data B2 equivalent to lower 16-bit data. The partial data B1 is directly inputted to a terminal T3 of the selector 78. On the other hand, the partial data B2 undergoes an F/F circuit 62 having a 16-bit width, and then, is inputted to a terminal T4 of the selector 78 with a delay of one cycle of the clock CLK1.

A distributor 42 divides the data C, which is the third word, outputted from the F/F circuit 26 into partial data C1 equivalent to upper 16-bit data and partial data C2 equivalent to lower 16-bit data. The partial data C1 is directly inputted to a terminal T5 of the selector 78. On the other hand, the partial data C2 undergoes an F/F circuit 64 having a 16-bit width, and then, is inputted to a terminal T6 of the selector 78 with a delay of one cycle of the clock CLK1.

A distributor 44 divides the data D, which is the fourth word, outputted from the F/F circuit 28 into partial data D1 equivalent to upper 16-bit data and partial data D2 equivalent to lower 16-bit data. The partial data D1 is directly inputted to a terminal T7 of the selector 78. On the other hand, the partial data D2 undergoes an F/F circuit 66 having a 16-bit width, and then, is inputted to a terminal T8 of the selector 78 with a delay of one cycle of the clock CLK1.

A distributor 46 divides the data E, which is the fifth word, outputted from the F/F circuit 30 into partial data E1 equivalent to upper 16-bit data and partial data E2 equivalent to lower 16-bit data. The partial data E1 is directly inputted to a terminal T9 of the selector 78. On the other hand, the partial data E2 undergoes an F/F circuit 68 having a 16-bit width, and then, is inputted to a terminal T10 of the selector 78 with a delay of one cycle of the clock CLK1.

A distributor 48 divides the data F, which is the sixth word, outputted from the F/F circuit 32 into partial data F1 equivalent to upper 16-bit data and partial data F2 equivalent to lower 16-bit data. The partial data F1 is directly inputted to a terminal T11 of the selector 78. On the other hand, the partial data F2 undergoes an F/F circuit 70 having a 16-bit width, and then, is inputted to a terminal T12 of the selector 78 with a delay of one cycle of the clock CLK1.

A distributor 50 divides the data G, which is the seventh word, outputted from the F/F circuit 34 into partial data G1 equivalent to upper 16-bit data and partial data G2 equivalent to lower 16-bit data. The partial data G1 is directly inputted to a terminal T13 of the selector 78. On the other hand, the partial data G2 undergoes an F/F circuit 72 having a 16-bit width, and then, is inputted to a terminal T14 of the selector 78 with a delay of one cycle of the clock CLK1.

A distributor 52 divides the data H, which is the eighth word, outputted from the F/F circuit 36 into partial data H1 equivalent to upper 16-bit data and partial data H2 equivalent to lower 16-bit data. The partial data H1 is directly inputted to a terminal T15 of the selector 78. On the other hand, the partial data H2 undergoes an F/F circuit 74 having a 16-bit width, and then, is inputted to a terminal T16 of the selector 78 with a delay of one cycle of the clock CLK1.

The selector 78 sequentially selects the terminals T1 to T16 each time the clock CLK1 rises. As a result, the partial data A1 to H2 are outputted from the selector 78 at a timing shown in FIG. 5(D).

The 16-word data A to P outputted from the F/F circuit 22 are also written into an SRAM 54. Of these, the data I to P, which are the ninth to 16th words, are read out from the SRAM 54 at a timing shown in FIG. 5(F), with a delay of three cycles of a clock CLK2 shown in FIG. 5(E). It is noted that the cycle of the clock CLK2 is equivalent to two times that of the clock CLK1.

To an output end of the SRAM 54, an F/F circuit 56 having a 32-bit width is connected. The F/F circuit 56 executes a latch operation in response to the clock CLK2. Therefore, the 8-word data I to P read out from the SRAM 54 are outputted from the F/F circuit 56 at a timing shown in FIG. 5(G).

A distributor 58 divides the data of each word outputted from the F/F circuit 56 into partial data of upper 16 bits and partial data of lower 16 bits. Ninth-word data I is divided into partial data I1 and I2; 10th-word data J is divided into partial data J1 and J2; 11th-word data K is divided into partial data K1 and K2; 12th-word data L is divided into partial data L1 and L2; 13th-word data M is divided into partial data M1 and M2; 14th-word data N is divided into partial data N1 and N2; 15th-word data O is divided into partial data O1 and O2; and 16th-word data P is divided into partial data P1 and P2.

The upper 16-bit partial data is directly inputted to a terminal T17 of the selector 78. On the other hand, the lower 16-bit partial data undergoes an F/F circuit 76 having a 16-bit width, and then, is inputted to a terminal T18 of the selector 78 with a delay of one cycle of the clock CLK1.

After completion of the selection of the terminal T16, the selector 78 alternately selects the terminals T17 and T18 each time the clock CLK1 rises. As a result, the partial data I1 to P2 are outputted from the selector 78 at a timing shown in FIG. 5(H).

An F/F circuit 80 has a 16-bit width, and latches the partial data A1 to P2 outputted from the selector 78 in response to the clock CLK1. As a result, the partial data A1 to P2 are outputted from the F/F circuit 80 at a timing shown in FIG. 5(I).

The 16-word data A to P outputted from the F/F circuit 22 are also applied to an F/F circuit 82 having a 32-bit width. The F/F circuit 82 latches the applied data A to P in response to the clock CLK1. The latched data A to P are outputted from the F/F circuit 82 at a timing shown in FIG. 6(D).

A selector 84 selects the partial data A1 to P2 outputted from the F/F circuit 80 when the SDRAM 16 is a memory in which a 16-bit width is adopted while selecting the data A to P outputted from the F/F circuit 82 when the SDRAM 16 is a memory in which a 32-bit width is adopted. The selected data is outputted to the SDRAM 16 via an output terminal 86.

As can be seen from the above-described explanation, the input terminal 20 fetches the 16-word data A to P, each word of which has a 32-bit width, from the data bus BS1. The F/F circuits 22 to 36 and the distributors 38 to 52 divide each of the preceding 8-word data A to H, out of the data A to P fetched by the input terminal 20, into the 16-bit partial data A1 to H2. On the other hand, the SRAM 54 temporarily holds the succeeding 8-word data I to P, out of the data A to P fetched by the input terminal 20. The distributor 58 divides each of the 8-word data I to P read out from the SRAM 54, into 16-bit partial data I1 to P2. The selector 78 outputs the thus-generated partial data A1 to P2 toward the SDRAM 16 in a time-division manner.

In this way, the dividing process on the preceding eight words is executed by the F/F circuits 22 to 36 and the distributors 38 to 52. Also, the dividing process on the succeeding eight words is executed by the distributor 58 after the temporal holding process by the SRAM 54. Furthermore, the partial data obtained by these dividing processes are outputted in a time-division manner. Thereby, it becomes possible to transfer the input data toward the SDRAM 16 having a bit width smaller than the bit width of the input data while inhibiting a circuit scale.

Figure 7:
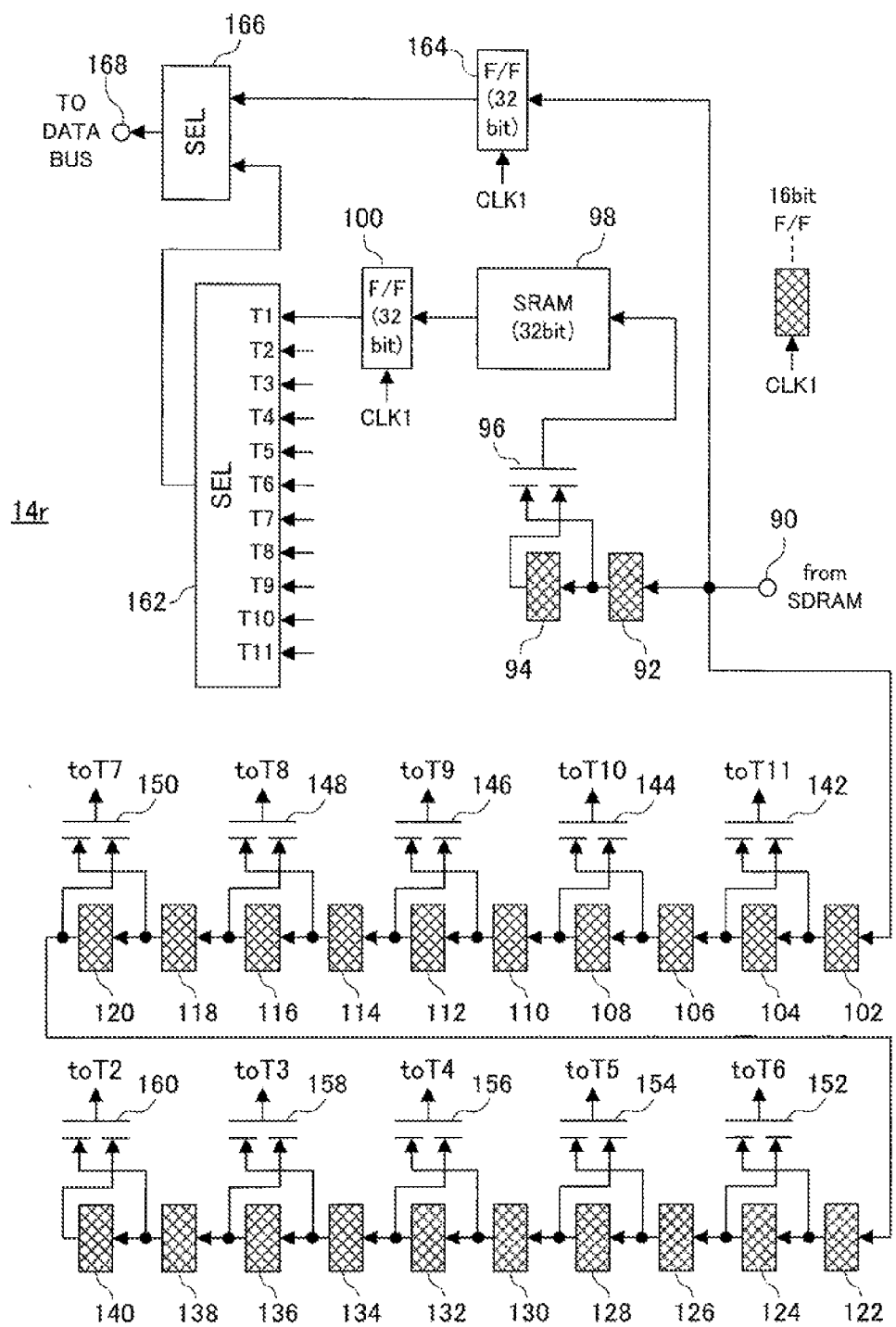
FIG. 7 is a block diagram showing one example of a configuration of a reading-out-data transfer circuit applied to the embodiment in FIG. 3.
Figure 9:
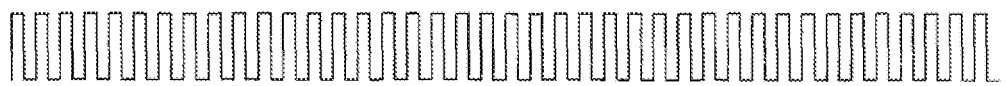
FIG. 9(A) is a waveform chart showing one example of the clock CLK1.
FIG. 9(B) is an illustrative view showing one example of the input dare.
FIG. 9(C) is an illustrative view showing'one example of the output data.
Figure 9:
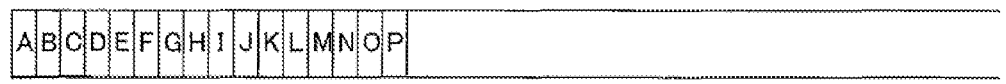
Figure 9:

The reading-out data transfer circuit 14r is configured as shown in FIG. 7. When the SDRAM 16 is a memory in which a 16-bit width is adopted, then the above-described 32-word data A1 to P2 are read out from the SDRAM 16. The read-out data A1 to P2 are applied to an input terminal 90 as shown in FIG. 8(B), in synchronization with the clock CLK1 shown in FIG. 8(A). On the other hand, when the SDRAM 16 is a memory in which a 32-bit width is adopted, then the above-described 16-word data A to P are read out from the SDRAM 16. The read-out data A to P are applied to the input terminal 90 as shown in FIG. 9(B), in synchronization with the clock CLK1 shown in FIG. 9(A).

A case where the SDRAM 16 is the memory in which the 16-bit width is adopted will be described. In this case, the data A1 to P2 fetched by the input terminal 90 are applied to the directly connected F/F circuits 92 to 94. Each of the F/F circuits 92 to 94 has a 16-bit width, and latches the data A1 to P2, in response to the clock CLK1. The data simultaneously outputted from the F/F circuits 92 to 94 are combined by a combinator 96 at each two cycles of the clock CLK1. Thereby, 16-word combined data A to P, each word of which has a 32-bit width, are created.

Herein, the combined data A is equivalent to data in which the data A1 and A2 are placed in upper 16 bits and lower 16 bits, respectively, and the combined data B is equivalent to data in which the data B1 and B2 are placed in upper 16 bits and lower 16 bits. The combined data C is equivalent to data in which the data C1 and C2 are placed in upper 16 bits and lower 16 bits, and the combined data D is equivalent to data in which the data D1 and D2 are placed in upper 16 bits and lower 16 bits.

The combined data E is equivalent to darn in which the data E1 and E2 are placed in upper 16 bits and lower 16 bits, and the combined data F is equivalent to data in which the data F1 and F2 are placed in upper 16 bits and lower 16 bits. The combined data G is equivalent to data in which the data G1 and G2 are placed in upper 16 bits and lower 16 bits, and the combined data H is equivalent to data in which the data H1 and H2 are placed in upper 16 bits and lower 16 bits.

The combined data I is equivalent to data in which the data I1 and I2 are placed in upper 16 bits and lower 16 bits, and the combined data J is equivalent to data in which the data J1 and J2 are placed in upper 16 bits and lower 16 bits. The combined data K is equivalent to data in which the data K1 and K2 are placed in upper 16 bits and lower 16 bits, and the combined data L is equivalent to data in which the data L1 and L2 are placed in upper 16 bits and lower 16 bits.

The combined data M is equivalent to data in which the data M1 and M2 are placed in upper 16 bits and lower 16 bits, and the combined data N is equivalent to data in which the data N1 and N2 are placed in upper 16 bits and lower 16 bits. The combined data O is equivalent to data in which the data O1 and O2 are placed in upper 16 bits and lower 16 bits, and the combined data P is equivalent to data in which the data P1 and P2 are placed in upper 16 bits and lower 16 bits.

The combined data A to P are outputted from the combinator 96 at a timing shown in FIG. 8(C), and out of these data, the combined data A to F are written into an SRAM 98. The combined data A to F accommodated in the SRAM 98 are read out in response to the clock CLK1, at a timing shown in FIG. 8(D), i.e., a timing at which the combined data H is outputted from the combinator 96. An F/F circuit 100 latches the combined data A to F outputted from the SRAM 98 in response to the clock CLK1, and outputs the latched combined data A to F with a delay of one cycle of the clock CLK1. The outputted combined data A to F are outputted at a timing shown in FIG. 8(E) via a terminal T1 of a selector 162.

The data A1 to P2 fetched by the input terminal 90 are applied to 20 directly connected F/F circuits 102 to 140. Each of the F/F circuits 102 to 140 has a 16-bit width, and latches the 32-word data A1 to P2, in response to the clock CLK1.

The data simultaneously outputted from the F/F circuits 102 to 104 are combined by a combinator 142 at each two cycles of the clock CLK1, and the combined data created thereby is applied to a terminal T11 of the selector 162. The data simultaneously outputted from the F/F circuits 106 to 108 are combined by a combinator 144 at each two cycles of the clock CLK1, and the combined data created thereby is applied to a terminal T10 of the selector 162.

The data simultaneously outputted from the F/F circuits 110 to 112 are combined by a combinator 146 at each two cycles of the clock CLK1, and the combined data created thereby is applied to a terminal T9 of the selector 162. The data simultaneously outputted from the F/F circuits 114 to 116 are combined by a combinator 148 at each two cycles of the clock CLK1, and the combined data created thereby is applied to a terminal T8 of the selector 162.

The data simultaneously outputted from the F/F circuits 118 to 120 are combined by a combinator 150 at each two cycles of the clock CLK1, and the combined data created thereby is applied to a terminal T7 of the selector 162. The data simultaneously outputted from the F/F circuits 122 to 124 are combined by a combinator 152 at each two cycles of the clock CLK1, and the combined data created thereby is applied to a terminal T6 of the selector 162.

The data simultaneously outputted from the F/F circuits 126 to 128 are combined by a combinator 154 at each two cycles of the clock CLK1, and the combined data created thereby is applied to a terminal T5 of the selector 162. The data simultaneously outputted from the F/F circuits 130 to 132 are combined by a combinator 156 at each two cycles of the clock CLK1, and the combined data created thereby is applied to a terminal T4 of the selector 162.

The data simultaneously outputted from the F/F circuits 134 to 136 are combined by a combinator 158 at each two cycles of the clock CLK1, and the combined data created thereby is applied to a terminal T3 of the selector 162. The data simultaneously outputted from the F/F circuits 138 to 140 are combined by a combinator 160 at each two cycles of the clock CLK1, and the combined data created thereby is applied to a terminal T2 of the selector 162.

The selector 162 selects in order the terminals T2 to T11 each time the clock CLK1 rises after outputting the data F applied to the terminal T1. As a result, the combined data G to P respectively created by the combinators 160 to 142 are outputted from the selector 162 at a timing shown in FIG. 8(F).

A selector 166 selects the selector 162 when the SDRAM 16 is a memory in which a 16-bit width is adopted. The combined data A to P outputted from the selector 162 are outputted toward the data bus BS1 as shown in FIG. 8(G).

A case where the SDRAM 16 is the memory in which a 32-bit width is adopted will be described. In this case, the data A to P fetched by the input terminal 90 are applied to an F/F circuit 164 having a 32-bit width. The F/F circuit 164 latches the data A to P in response to the clock CLK1, and applies the latched data A to P to the selector 166. The selector 166 selects the F/F circuit 164 when the SDRAM 16 is a memory in which a 32-bit width is adopted. Therefore, the data A to P applied from the F/F circuit 164 are outputted toward the data bus BS1 as shown in FIG. 9(C).

As can be seen from the above-described explanation, the input terminal 90 fetches the 32-word data A1 to P2, each word of which has a 16-bit width when the SDRAM 16 is the memory in which a 16-bit width is adopted. The combinator 96 combines the fetched data A1 to P2 so as to create the 16-word combined data A to P, each word of which has a 32-bit width. The 6-word preceding combined data A to F, out of the created combined data A to P, are temporarily held by the SRAM 98.

The combinators 142 to 160 combine the 20-word succeeding data G1 to P2, out of the data A1 to P2 fetched by the input terminal 90, so as to create 10-word combined data G to P, each word of which has a 32-bit width. The selector 162 outputs the combined data A to F held by the SRAM 98 and the combined data G to P created by the combinators 142 to 160 in a time-division manner.

Thus, the combined data A to F corresponding to the preceding six words are created by the combinator 96, and are temporarily held by the SRAM 98. Moreover, the combined data G to P corresponding to the succeeding 10 words are created by the combinators 142 to 160. Furthermore, such combined data A to P are outputted in a time-division manner. Thereby, it becomes possible to transfer the input data toward the data bus BS1 having a bit width larger than a bit width of the input data while inhibiting a circuit scale.

It is noted that as the data processing apparatus 10 of this embodiment, any electronic device, such as a digital camera and an audio player, which processes data by utilizing an SDRAM is assumed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data transfer circuit, comprising:
   an inputter which inputs data having L words (L: integer of 2 or more), each word of which has a first bit width;
   a first divider which divides each data of preceding M words (M: integer of less than L), out of the data inputted by said inputter, into partial data having a second bit width smaller than the first bit width;
   a holder which temporarily holds data having N words (N: integer equivalent to L-M) succeeding to the M words, out of the data inputted by said inputter;
   a second divider which divides each data of the N words held by said holder, into partial data having the second bit width, after completeion of the dividing process of said first divider; and
   an outputter which outputs the partial data divided by said first divider and the partial data divided by said second divider in a time-division manner.

2. A data transfer circuit according to claim 1, wherein said first divider includes M of data latchers each of which has the first bit width and which are connected in series to one another, and M of data dividers respectively corresponding to the M of data latchers.

3. A data transfer circuit according to claim 2, wherein the second bit width is equivalent to 1/K (K: integer of 2 or more) of the first bit width, said inputter inputs the data of each word in each first period, each of the M of data latchers executes a data latching process in each second period equivalent to 1/K of the first period, and said outputter selects the partial data in each of the first periods.

4. A data transfer circuit, comprising:
   an inputter which inputs data having L words (L: integer of 2 or more), each word of which has a first bit width;
   a first divider which divides each data of preceding M words (M: integer of less than L), out of the data inputted by said inputter, into partial data having a second bit width smaller than the first bit width;
   a holder which temporarily holds data having N words (N: integer equivalent to L-M) succeeding to the M words, out of the data inputted by said inputter;
   a second divider which divides each data of the N words held by said holder, into partial data having the second bit width; and
   an ouputter which outputs the partial data divided by said first divider and the partial data divided by said second divider in a time-division manner, wherein said holder sequentially outputs the N-word data at each word, and said second divider sequentially divides the data of each word outputted from said holder.

5. A data transfer circuit, comprising:
   an inputter which inputs data having L words (L: integer of 2 or more), each word of which has a first bit width;
   a first combiner which combines data of at least preceding M words (M: integer of less than L), out of the data inputted by said inputter so as to create combined data, each word of which has a second bit width larger than the first bit width;
   a holder which temporarily holds the combined data created by said first combiner;
   a second combiner which combines data of succeeding N words (N: integer equivalent to L-M), out of the data inputted by said inputter, so as to create combined data, each word of which has the second bit width; and
   an outputter which outputs the combined data held by said holder and the combined data created by said second combiner in a time-division manner, wherein said ouputter control a timing of data reading from said holder so that a beginning word of the combined data created by said second combiner follows an ending word of the combined data created by said first combiner.

6. A data transfer circuit according to claim 5, wherein the second bit width is equivalent to K times the first bit width, said second combiner includes N of data latchers each of which has the first bit width and which are connected in series to one another, and N/K of data combiners which combines the data latched by the N of data latchers in each K words.

7. A data transfer circuit according to claim 5, wherein said first combiner executes a combining process in parallel with the inputting process of said inputter, and said second combiner executes a combining process in parallel with the holding process of said holder.

* * * * *